(12) United States Patent
Tezuka (10) Patent No.: US 7,503,631 B2
(45) Date of Patent: Mar. 17, 2009

(54) VEHICLE BRAKING SYSTEM AND VEHICLE BRAKING METHOD

(75) Inventor: Syunsuke Tezuka, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 186 days.

(21) Appl. No.: 11/138,214

(22) Filed: May 27, 2005

(65) Prior Publication Data

US 2005/0264102 A1 Dec. 1, 2005

(30) Foreign Application Priority Data

May 31, 2004 (JP) ............................ P2004-161001

(51) Int. Cl.
*B60T 8/64* (2006.01)
(52) U.S. Cl. ...................................... 303/152
(58) Field of Classification Search ................. 303/152, 303/20, 186, 112
See application file for complete search history.

(56) References Cited

U.S. PATENT DOCUMENTS

| | | | |
|---|---|---|---|
| 6,655,754 B2 * | 12/2003 | Crombez et al. ............ | 303/152 |
| 6,663,197 B2 * | 12/2003 | Joyce .......................... | 303/152 |
| 6,739,675 B1 * | 5/2004 | Scharpf et al. ................. | 303/7 |
| 6,811,229 B2 * | 11/2004 | Soga ........................... | 303/152 |
| 6,988,779 B2 * | 1/2006 | Amanuma et al. .......... | 303/152 |
| 7,131,708 B2 * | 11/2006 | Tao et al. .................... | 303/152 |
| 2002/0180266 A1 * | 12/2002 | Hara et al. .................. | 303/152 |
| 2006/0152078 A1 * | 7/2006 | Bald ........................... | 303/155 |

FOREIGN PATENT DOCUMENTS

| | | |
|---|---|---|
| JP | 4-331336 | 11/1992 |
| JP | 4331336 | * 11/1992 |
| JP | 10-157589 | 6/1998 |
| JP | 10-203351 | 8/1998 |
| JP | 10-318862 | 12/1998 |
| JP | 11-115719 | 4/1999 |
| JP | 2002-22579 | 1/2002 |
| JP | 2002-39744 | 2/2002 |

* cited by examiner

*Primary Examiner*—Robert A Siconolfi
*Assistant Examiner*—Mariano Sy
(74) *Attorney, Agent, or Firm*—McGinn IP Law Group, PLLC (57) ABSTRACT

A detection unit directly detects an operating force acting on a wheel. A computation unit respectively computes a current value of a regenerative braking force and a current value of a friction braking force based on the result of a detection by the detection unit. A setting unit sets a target value of the regenerative braking force and a target value of the friction braking force based on a required braking force. A control unit controls a regenerative braking device based on the current value of the regenerative braking force so that the regenerative braking force approaches to the target value and also controls a friction braking device based on the current value of the friction braking force so that the friction braking force approaches to the target value.

23 Claims, 5 Drawing Sheets

VEHICLE BRAKING SYSTEM AND VEHICLE BRAKING METHOD

CROSS REFERENCE TO RELATED APPLICATIONS

The present application claims foreign priority based on Japanese Patent Application No. P.2004-161001, filed on May 31, 2004, the contents of which are incorporated herein by reference.

BACKGROUND OF THE INVENTION

1. Field of the Invention

The present invention relates to a vehicle braking system and a vehicle braking method, and more particularly to vehicle braking that is effected using both a regenerative braking device and a friction braking device.

2. Related Art

In recent years, electric vehicles are known as friendly vehicles to the global environment. In general, in an electric vehicle, a motor is driven by electricity power supplied from a battery to thereby generate a driving force in a wheel. On the other hand, at the time of braking, the motor, which is a drive source, is used as a generator to convert kinetic energy into electric energy to thereby recover the energy. At the time of generation like this, a load corresponding to the amount of electricity power generated by the motor is applied to the wheel so as to perform regenerative braking to thereby generate a braking force in the wheel. For example, JP-A-10-203351 discloses a method for controlling the regenerative braking and friction braking in which a braking force is provided by adjusting a frictional force via hydraulic pressure in a cooperative fashion. In the method of JP-A-10-203351, a maximum value of the regenerative braking force is calculated from the charged status of the battery, and a balance between the regenerative braking force and the friction braking force is determined appropriately based on the result of the calculation so as to satisfy a required braking force that is required for the wheel.

However, in the method of JP-A-10-203351, a feed forward control is performed by estimating both a regenerative braking force and a friction braking force which are to be given to the wheel. Therefore, a braking force actually applied to the wheel is only estimated. As a result, it is difficult to perform the cooperative control with high accuracy.

SUMMARY OF THE INVENTION

An object of one or more embodiments of the present invention is to perform a cooperative control of the friction braking and regenerative braking with high accuracy by accurately monitoring the regenerative braking force and friction braking force which are given to the wheel.

In accordance with one or more embodiments of the present invention, a vehicle braking system includes a regenerative braking device for giving a wheel a regenerative braking force according to an amount of power generated by a motor, a friction braking device for giving the wheel a friction braking force according to a frictional force, a detection unit for direct detecting an operating force that acts on the wheel, a computation unit for respectively computing a current value of the regenerative braking force and a current value of the friction braking force based on the result of a detection by the detection unit, a setting unit for setting a target value for the regenerative braking force and a target value for the friction braking force based on a required braking force which is a braking force required for the wheel, and a control unit for controlling the regenerative braking device based on the current value of the regenerative braking force so that the regenerative braking force approaches to the target value for the regenerative braking force and controlling the friction braking device based on the current value of the friction braking force so that the friction braking force approaches to the target value for the friction braking force.

In accordance with one or more embodiments of the present invention, the detection unit preferably detects as the operating force a longitudinal force and a brake torque, and the computation unit preferably computes a current value of the friction braking force based on the brake torque and a current value of the regenerative braking force based on a value resulting by subtracting a longitudinal force attributed to the braking torque from the longitudinal force.

In accordance with one or more embodiments of the present invention, the vehicle preferably has a plurality of wheels to the wheel and a plurality of motors to the motor which are provided one for each wheel, and the control unit preferably adjust the regenerative braking force for each of the wheels by controlling each of the motors.

In accordance with one or more embodiments of the present invention, the vehicle preferably has a plurality of wheels to the wheel and further a power distribution device for variably setting a distribution ratio of the regenerative braking force given to each of the wheels by the motor, and the control unit preferably adjusts the regenerative braking force for the respective wheels as a group by controlling the power distribution device and the motors.

In accordance with one or more embodiments of the present invention, there is provided a vehicle braking method for braking by controlling a regenerative braking device for giving a wheel a regenerative braking force according to an amount of power generated by a motor and a friction braking device for giving a wheel a friction braking force according to a frictional force. The vehicle braking method has a first step of direct detecting an operating force that acts on the wheel and respectively computing a current value of the regenerative braking force and a current value of the friction braking force based on the result of the detection, a second step of setting a target value for the regenerative braking force and a target value for the friction braking force based on a required braking force which is a braking force required for the wheel, and a third step of controlling the regenerative braking device based on a current value of the regenerative braking force so that the regenerative braking force approaches a target value for the regenerative braking force and controlling the friction braking device based on a current value of the friction braking force so that the friction braking force approaches a target value for the friction braking force.

According to one or more embodiments of the present invention, the operating force is detected directly by the detection unit. Since the values of the friction braking force by the friction braking device and the regenerative braking force by the regenerative braking device are reflected as the operating force on the wheel, these values can be specified based on the result of the detection. Due to this, the cooperative control of the friction braking and regenerative braking can be performed with high accuracy by performing a feedback-like control based on the detected values while appropriately monitoring the respective braking forces.

Other aspects and advantages of the invention will be apparent from the following description and the appended claims.

DESCRIPTION OF THE PREFERRED EMBODIMENTS

Embodiments of the invention will be described with reference to the accompanying drawings.

First Embodiment

Figure 1:
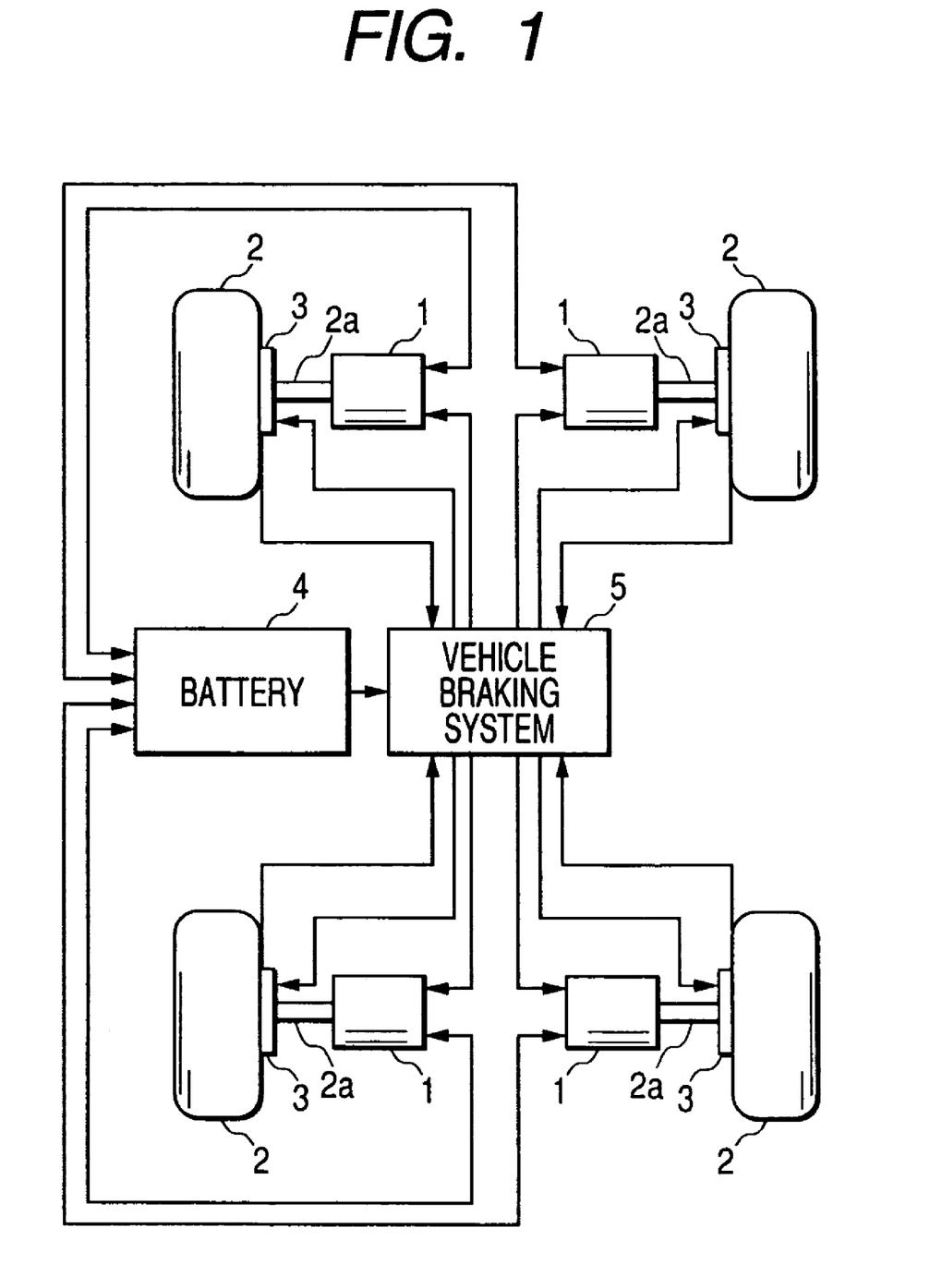
FIG. 1 is an explanatory drawing of a vehicle to which a vehicle braking system according to a first embodiment is applied.

FIG. 1 is an explanatory drawing of a vehicle to which a vehicle braking system according to a first embodiment is applied. The vehicle is an electric vehicle with motors, each of motors drives each of wheels. That is, In the first embodiment, the vehicle drives all wheel by each motor corresponding to each wheel. Power from the motor 1 is transmitted to the wheel 2 via its own output shaft which corresponds to an axle 2a. When rotational torque is applied to the wheel 2 in association with such power transmission, the wheel 2 rotates, whereby a driving force is given to the wheel 2. A friction braking device 3 is provided on each wheel 2. Regarding friction braking device, there are two types of devices which are pneumatic and hydraulic friction braking devices, and these differ from each other in approaches to adjusting frictional force. In the first embodiment, hydraulic friction braking device which mainly includes a caliper, a disc rotor and brake pads is used in the first embodiment. The friction braking device 3 of this type is such that a frictional force is generated by pressing the brake pads against the disc rotor by the caliper.

Braking torque is applied to the wheel 2 by virtue of the frictional force so generated, whereby a braking force is given to the wheel 2. The braking force (friction braking force) obtained by the friction braking can be controlled by adjusting a hydraulic pressure supplied to a cylinder inside the caliper.

In the electric vehicle constructed as has been described above, the motor 1 generates electric power by using a transmission torque transmitted from the wheel 2 as a drive source. The power generated by the motor 1 is stored in a battery 4 which stores power that is to be supplied to the motor 1. When power is generated by the motor 1, a braking force according to the amount of power so generated is given to the wheel 2. The power generation by the motor 1 is represented by a value which corresponds to the strength of a magnetic field generated inside the motor 1 and the rotational speed of the wheel 2. Due to this, a braking force (regenerative braking force) obtained through regenerative braking can be controlled by changing the strength of the magnetic field inside the motor. The magnetic field strength of the motor 1 can be set to an arbitrary value according to an indication signal Smf that is outputted to the motor 1. Thus, the motor 1 not only functions as the drive source but also functions as the regenerative braking device which performs regenerative braking.

Figure 2:
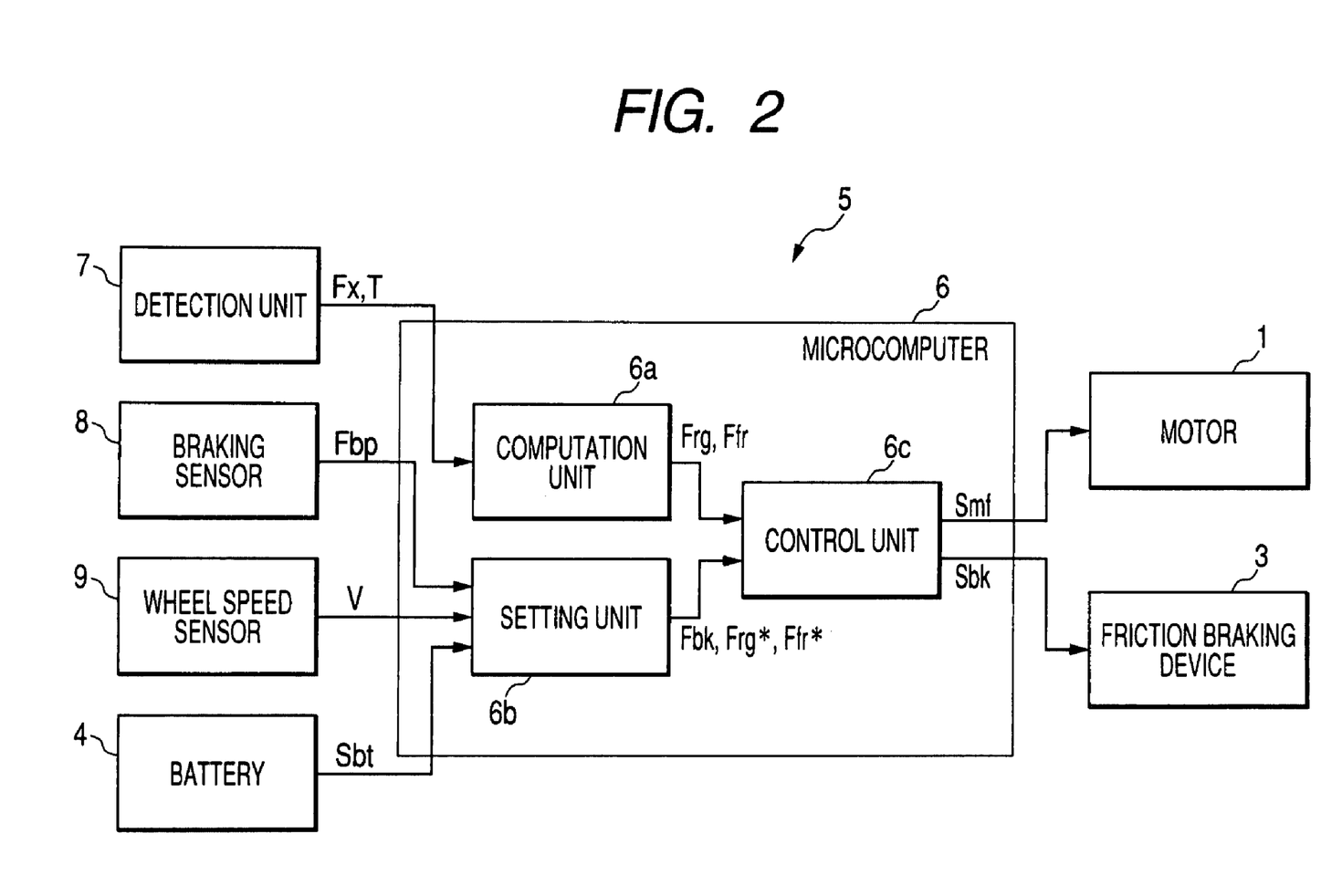
FIG. 2 is a block-diagram showing the configuration of the vehicle braking system.

FIG. 2 is a block diagram showing the configuration of a vehicle braking system 5. This vehicle braking system 5 mainly comprises a microcomputer 6 which includes a CPU, a ROM, a RAM, an input/output interface and the like. This microcomputer 6 performs a cooperative control between regenerative braking and friction braking so as to establish an appropriate balance between the regenerative braking force and the friction braking force. Detection signals detected by the detection unit 7 and the like and a status signal Sbt indicating the status of the battery 4 are inputted into the microcomputer 6.

Figure 3:
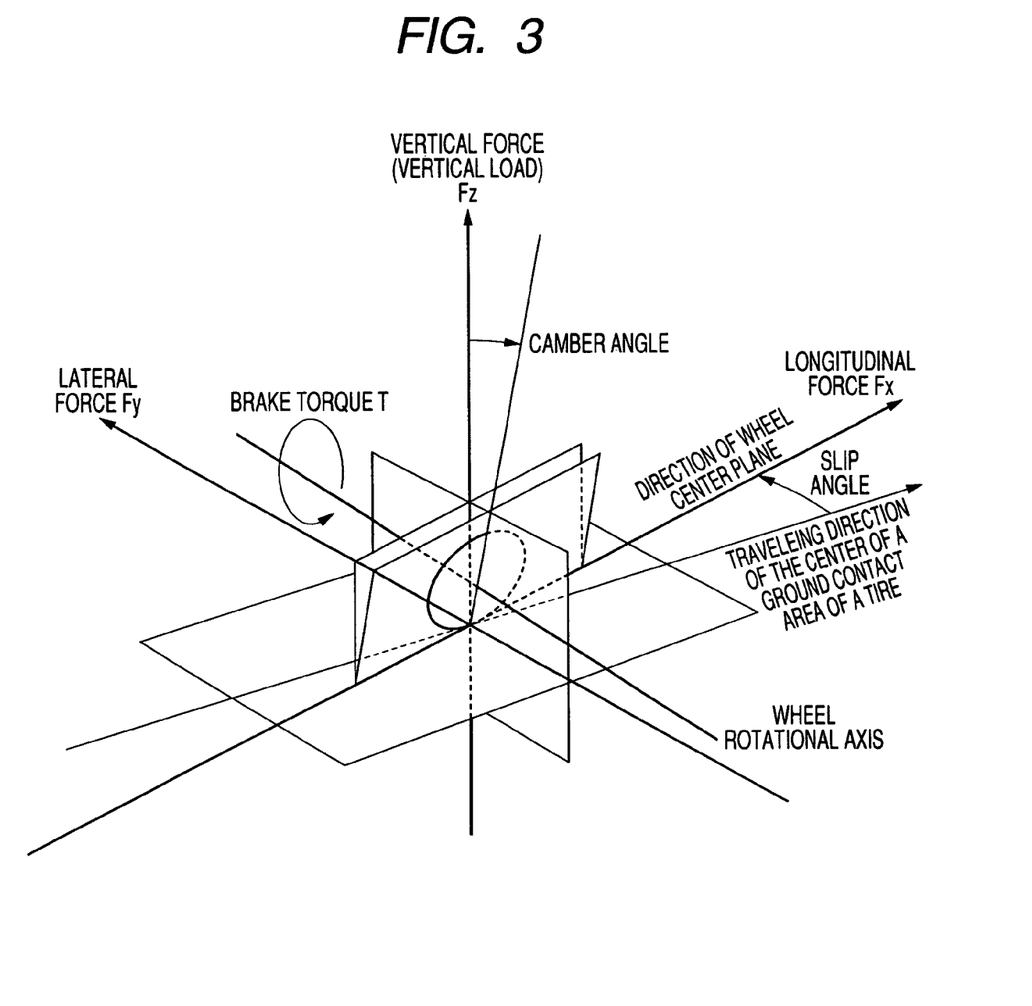
FIG. 3 is an explanatory drawing of operating forces acting on a wheel.

FIG. 3 is an explanatory drawing of operating force (tire force applied to wheel). While only one block is shown as corresponding to the detection unit in FIG. 2 as matter of convenience, the detection unit 7 is, in reality, provided on the axle 2a (the output shaft of the motor 1) of each of the wheels 2 to detect an operating force that acts on the wheel 2. The operating force detected by the detection unit 7 includes component forces in three directions such as a longitudinal force Fx, a lateral force Fy and a vertical force Fz and a brake torque T. The longitudinal force Fx is a component force of a frictional force generated in the ground contact surface of the wheel 2 which is generated in a direction (an x axis) parallel with a center plane of the wheel, and the lateral force Fy is a component force generated in a direction (a y axis) normal to the center plane of the wheel. On the other hand, the vertical force Fz is a force acting in a vertical direction (a z axis), that is, a so-called vertical load. The brake torque T is a torque (a torsional force) around a rotational axis of the wheel 2. In the first embodiment, of these operating forces, the longitudinal force F and the brake torque T become important.

Each of the detection units 7 comprises a strain gauge and a signal processing circuit which processes an electric signal outputted from the strain gauge to thereby generates a detection signal according to the operating force. The operating force is directly detected by embedding the strain gauge in the axle 2a based on the knowledge that a stress generated in the axle 2a is proportional to an operating force acting thereon. Note that since the specific configuration of the detection unit 7 is shown in, for example, JP-A-04-331336 and JP-A-10-318862.

A brake sensor 8 is a sensor for detecting a pedaling force Fbp applied onto a brake pedal by the driver and for example, a pressure sensor for detecting a cylinder pressure of a brake master cylinder (not shown) may be used. A wheel speed sensor 9 is a sensor for detecting the wheel speed V of each of the wheels 2 and generates a pulse signal V in a cycle corresponding to the wheel speed. Note that while only a single block is shown as representing the wheel speed sensor 9 in FIG. 2, as with the detection unit 7, the wheel speed sensor 9 is provided for each of the wheels 2.

When viewed from the functional point of view, the microcomputer 6 has a computation unit 6a, a setting unit 6b and a control unit 6c. The computation unit 6a computes, respectively, a current value Frg (hereinafter, simply referred to as a "regenerative force") of a regenerative braking force applied to the wheel 2 and a current value Ffr (hereinafter, simply referred to as a "frictional force") of a frictional force applied to the wheel 2 based on the result of a detection by the detection unit 7. The setting unit 6b sets a target regenerative force Frg* which is a target value of the regenerative braking force and a target frictional force Fr* which is a target value of the friction braking force based on a required braking force Fbk which is a braking force required for the wheel 2. The control unit 6c controls the regenerative braking device (in the first embodiment, the motor 1) based on the regenerative force Frg so that the regenerative braking force approaches to the target regenerative force Frg* and also controls the friction braking device 3 based on the frictional force Ffr so that the friction braking force approaches to the target friction force Ffr*.

Figure 4:
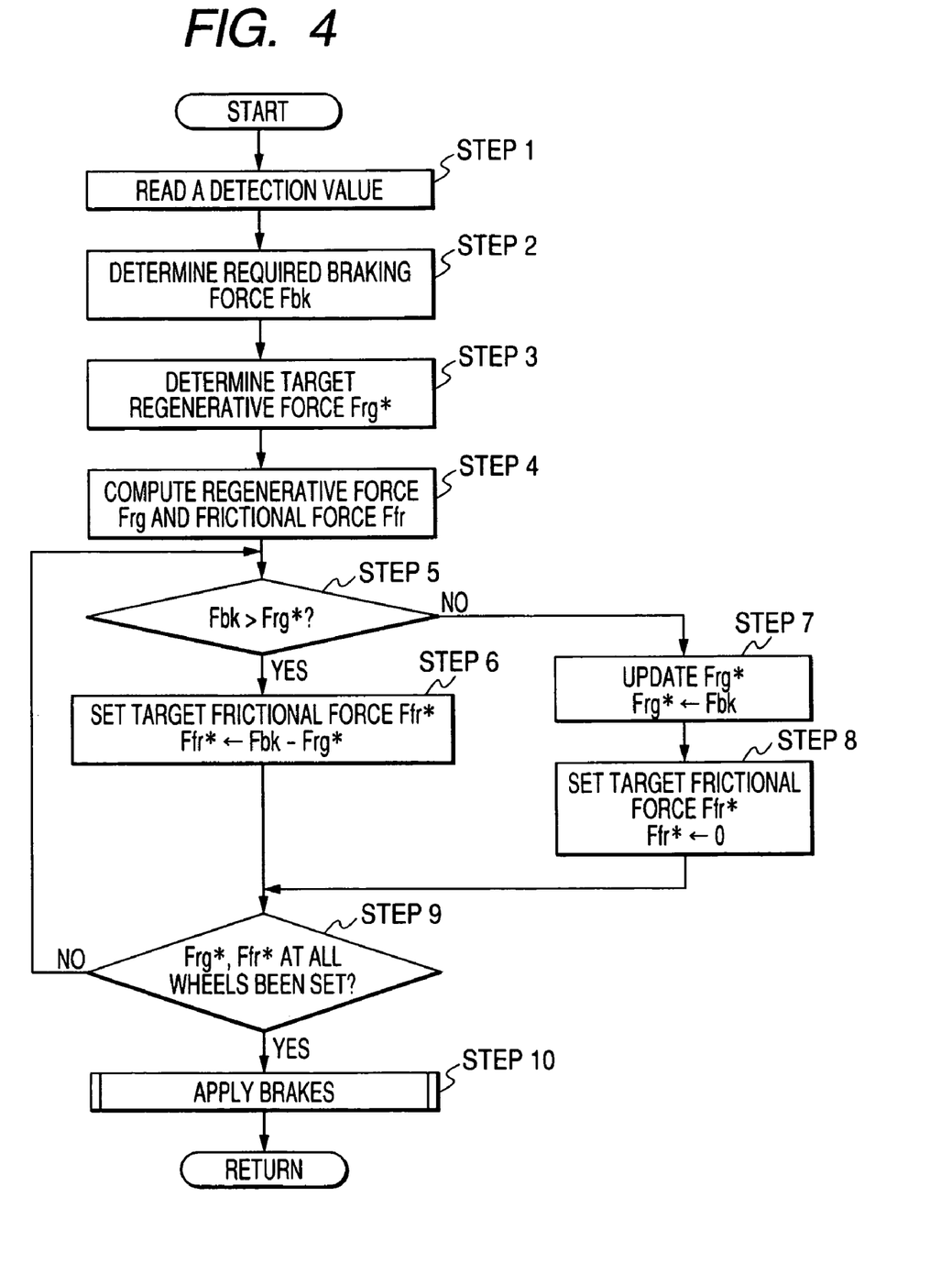
FIG. 4 is a flowchart illustrating a vehicle braking routine according to the first embodiment.

FIG. 4 is a flowchart illustrating a vehicle braking routine according to the embodiment. Firstly, in step 1, a longitudinal force Fx and a brake torque T, which are detected by the detection unit 7, are obtained. In addition, a brake pedaling force Fbp, which is detected by the brake sensor 8, and a wheel speed V of each wheel 2, which is detected by the wheel speed sensor 9, are obtained.

In step 2, a required braking force Fbk that is required at each wheel 2 is determined. While an optimal value of the required braking force Fbk can be determined using various methods, a method is raised as an example thereof in which the value is determined depending on the pedaling force of the brake pedal. In the method of the embodiment, a required braking force Fbk at each wheel 2 is determined singularly based on a current brake pedaling force bp by referring to a map or a computing equation. The map or computing equation is such that a corresponding relation between the brake pedaling force Fbp and the required braking force Fbk is prepared in advance through simulations or experiments, and the corresponding relation therebetween is stored in the ROM of the microcomputer 6.

Moreover, in addition to the method using the brake pedaling force Fbp, the required braking force Fbk may be determined as a value according to the running conditions of the vehicle. In the method, from the viewpoint of improving the stability of the vehicle during cornering, a braking force of an appropriate value is applied to the appropriate wheel 2 based on the relation between forces acting on the vehicle during cornering. As this occurs, a target braking force Fbk is computed based on a deviation of an actual yaw rate from a target yaw rate, whereby the target braking force Fbk so computed becomes a braking force that is to be applied to the selected wheel. When there exists a tendency of under steering, the inner wheel 2 becomes the selected wheel, whereas when there exists a tendency of over steering, the outer wheel 2 constitutes the selected wheel. Note that since the method of computing a required braking force Fbk according to the running conditions of the vehicle is disclosed in, for example, JP-A-11-115719 and JP-A-10-157589.

In step 3, a target regenerative force Frg* for each wheel 2 is set. In view of the point that braking energy is converted into electric energy with good efficiency, all the braking force that is necessary is preferably provided by the regenerative braking force. In this case, the target regenerative force Frg* becomes the required braking force Fbk. Incidentally, the regenerative braking force takes a value which corresponds to the amount of power generated by the motor 1, in other words, the amount of power that is stored in the battery 4. Since there exists an upper limit of the capacity of the battery 4, the battery 4 cannot be charged with power generated by the motor 1 beyond the capacity thereof. Due to this, the regenerative braking force cannot be set to a value at which the amount of power stored-therein exceeds a maximum value of the capacity of the battery 4. Then, in this step 3, a maximum power amount is computed based on a status signal Sbt which indicates the charged status of the battery 4. Next, an amount of power that is to be generated at each wheel 2 is specified so that a total sum of the amounts of power at the respective wheels 2 corresponds to the maximum power amount. Take the following for example; the amount of power at each wheel 2 is set to a value corresponding to the ratio of required braking force Fbk at each wheel 2. Then, a target regenerative force Frg* at each wheel 2 is set based on the amount of power so specified at each wheel.

In step 4, a regenerative force Frg and a friction force Ffr are computed. These forces Frg, Ffr are determined singularly based on the longitudinal force Fx and the brake torque T. A current value Ffr (hereinafter, simply referred to as a "frictional force") of the friction braking force is computed based on the brake torque T from the knowledge that a friction braking force is given to the wheel 2 by virtue of a brake torque T attributed to a frictional force between the brake pads and the disc rotor. In contrast to this, a braking force given to the wheel 2 corresponds to the longitudinal force Fx detected. Then, a current value Frg (hereinafter, simply referred to as a "regenerative force") of the regenerative braking force is computed by subtracting a longitudinal force generated by the friction braking from the longitudinal force Fx. Note that since the longitudinal force gene-rated by the friction braking is a value attributed to the brake torque T, this longitudinal force can be computed singularly based on the brake torque T.

In step 5, whether or not the required braking force Fbk is larger than the target regenerative force Frg* is determined by comparing the required braking force Fbk and the target regenerative force Frg* of one of the wheels 2. In this step 5, if the result of the comparison is determined as affirmative, that is, if the required braking force Fbk is larger than the target regenerative force Frg* (Fbk>Frg*), then proceed to step 6. Then, a value (Fbk−Frg*) resulting by subtracting the target regenerative force Frg* from the required braking force Fbk is set as a target frictional force Ffr* (step 6). On the other hand, in this step 5, if the result of the comparison is determined as negative, that is, if the required braking force Fbk is equal to or smaller than the target regenerative force Frg* (Fbk≦Frg*), then proceed to step 7. Then, the target regenerative force Frg* is updated to the required braking force Fbk (step 7), and the target frictional force Ffg* is set to 0 (step 8).

In step 9, whether or not target values of the braking forces, that is, target regenerative forces Frg* and target frictional forces Ffg* at all the wheels 2 provided on the vehicle have been determined is determined. In this step 9, if the result of the determination is affirmative, that is, if the target values Frg*, Ffr* have been set at all the wheels 2, then, proceed to step 10, whereas if there exists the wheel 2 at which the target values Frg*, Ffr* have not yet been set, then return to step 5, and target values Frg*, Ffr* are set as has been described above only for the relevant wheel 2.

In step 10, the motor 1, which is the regenerating braking device, is controlled at each wheel 2. To be specific, a magnetic field strength indication signal Smf is determined which is such as to compensate for a difference between the target regenerative force Frg* and the regenerative force Frg based on a magnetic field strength indication signal Smf that is currently indicated relative to the motor 1. As this occurs, a wheel speed V that is detected by the wheel sensor 9 is referred to. Then, the indication signal Smf so determined is outputted to the motor 1. Similarly, an indication signal Sbk is determined which is such as to compensate for a difference between the target frictional force Ffr* and the frictional force Ffr based on an indication signal Sbk that is currently indicated relative to the friction braking device 3. Then, the indication signal Sbk so determined is outputted to the friction braking device 3.

According to the first embodiment, the longitudinal force Fx and the brake torque T, which constitute the operating force, are determined by the detection unit 7. The brake torque T can specify the braking force (the frictional force Ffr) applied during friction braking. In addition, since the longitudinal force Fx corresponds to the total braking force given to the wheel 2, the braking force (the regenerative force Frg) by regenerative braking can be specified based on the value resulting by subtracting the longitudinal force resulting by the friction braking from the longitudinal force Fx which is the detected value. By directly detecting the operating force, the individual braking forces resulting during friction braking and regenerative braking can be specified with good accuracy. Due to this, when compared with the method in which individual braking forces are specified through estimation, the respective braking force can be monitored appropriately, thereby making it possible to perform a cooperative control of the friction braking and regenerative braking with high accuracy. In addition, the individual braking forces are specified with good accuracy, and thereafter, the friction braking is performed in such a manner as to compensate for a shortage of braking force due to the regenerative braking being insufficient to satisfy the required braking force Fbk, whereby the braking force required for the wheel 2 (the required braking force Fbk) can be obtained effectively while realizing the improvement in conversion efficiency to electric energy.

Second Embodiment

Figure 5:
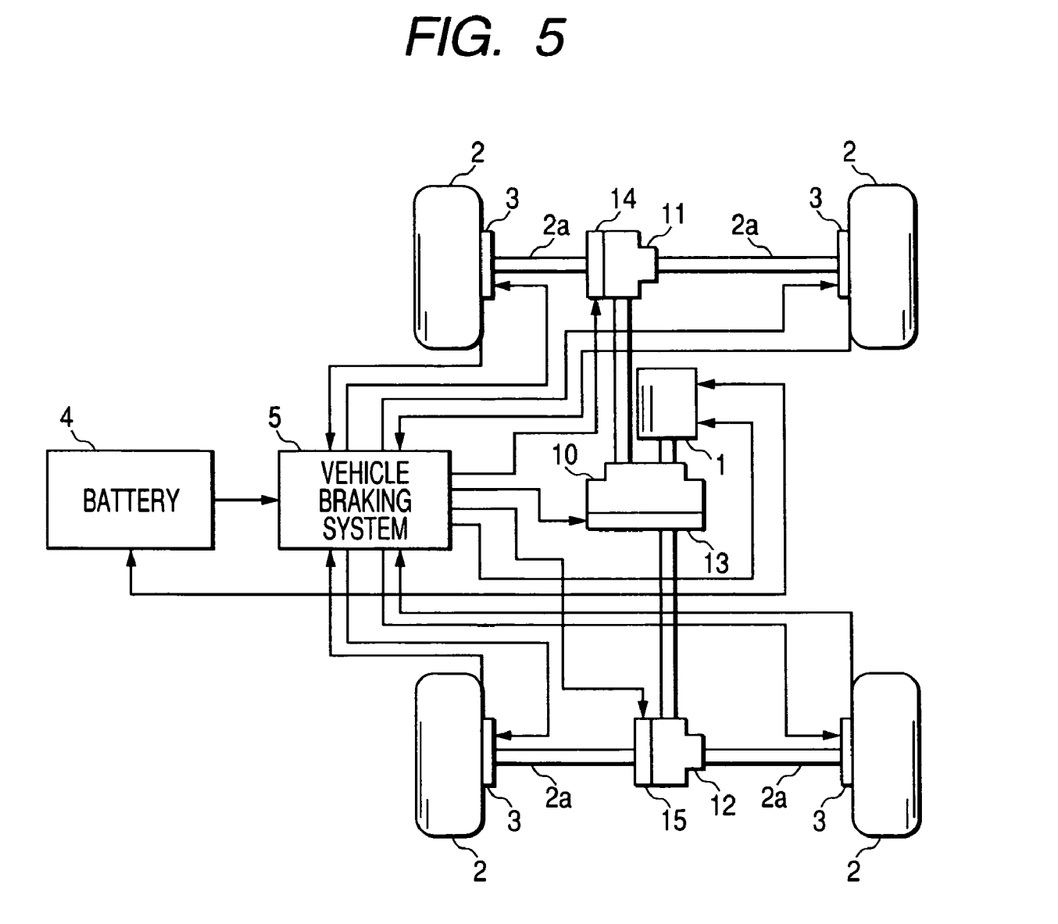
FIG. 5 is an explanatory drawing of a vehicle to which a vehicle braking system according to a second embodiment is applied.

FIG. 5 is an explanatory drawing of a vehicle to which a vehicle braking system according to a second embodiment is applied. The second embodiment differs from the first embodiment in that a plurality of wheels 2 are driven by a single motor. In the second embodiment, a single motor 1 is provided for four wheels 2. Note that in the following description, same reference numerals are given to the same constituent components to those of the first embodiment, and a detailed description thereof will be omitted.

Power from the motor 1 is transmitted to a center differential 10, and the power transmitted to the center differential 10 is then respectively transmitted to a front differential 11 provided on the side of front wheels and a rear differential 12 provided on the side of rear wheels. The center differential 10 is, for example, a compound planetary gear type differential. A hydraulic multi-disc clutch 13 having a function to limit its own differential movement is provided in this center differential 10, whereby a distribution ratio of power transmitted to the respective differentials 11, 12 is variably set according to the extent of engagement of the center clutch 13.

Power transmitted to the front differential 11 is transmitted both left and right front wheels 2 via axles 2a, whereby the left and right front wheels 2 rotate and a driving force is given to each wheel 2. As the front differential 11, a bevel gear type differential can be used. A hydraulic multi-disc front clutch 14 having a function to limit its own differential movement is provided in the front differential 11, whereby a distribution ratio of the power transmitted to the left and right front wheels 2 is variably set according to the extent of engagement of the front clutch 14.

Power transmitted to the rear differential 12 is respectively transmitted to the left and right rear wheels 2 via axles 2a. As with the front differential 11, a hydraulic multi-disc rear clutch 15 having a function to limit its own differential movement is also provided on the side of the rear wheels. As a result, a distribution ratio of power transmitted to the left and right rear wheels is variably set according to the extent of engagement of the rear clutch 15.

A pressing plate for pressing clutch plates, a piston, a cylinder and the like (not shown) are provided on each of the clutches 13 to 15. A hydraulic system (not shown) is connected to each cylinder via a predetermined flow path. An engagement force at each of the clutches 13 to 15 is adjusted by adjusting a cylinder pressure supplied to each cylinder. As a result, the distribution ratio of power transmitted to each wheel 2 can arbitrarily changed. The engagement forces of these clutches 13 to 15 can also be controlled by a vehicle braking system. A power distribution system including the respective differentials 10 to 12 and the respective clutches 13 to 15 not only can serve to function to variably set the distribution ratios of power transmitted to the wheels 2 but also can set variably distribution ratios of regenerative braking force that is given to the wheels 2 by the motor 1. Namely, this power distribution system serves to function as a regenerative braking device.

In an electric vehicle of a power distribution type like this, the vehicle braking system performs a cooperative control of regenerative braking and friction braking as with the first embodiment. To be specific, a required braking force Fbk at each wheel 2 is determined, and a target regenerative force Frg* at each wheel 2 is determined. This target regenerative force Feg* constitutes a maximum value of the regenerative braking force that the motor 1 can generate, and individual values of the target regenerative forces Frg* at the respective wheels 2 are determined such that a total sum of the respective target regenerative forces Frg* becomes equal to the maximum value of the regenerative braking force by the motor 1. Take the following for example; a target regenerative force Frg* at each wheel 2 is set to a value according to the ratio of the required braking force Fbk at each wheel 2. Then, a regenerative force Frg and a frictional force Ffr are computed based on the result of a detection by a detection unit 7, and thereafter, values of the target regenerative force Feg* and the target frictional force Ffr* are finally determined.

Next, the respective clutches 13 to 15, which are the regenerative braking devices, and the motor 1 are controlled based on the regenerative force Frg in such a manner that the regenerative braking force approaches the target regenerative force Frg*. In the power distribution type electric vehicle, the regenerative force Frg at each wheel 2 becomes the power distribution ratios by the respective differentials 10 to 12. Due to this, the regenerative braking force is preferably adjusted for the four wheels 2 as a group. To be specific, the cylinder pressures at the respective clutches 13 to 15 are controlled so as to provide a power distribution ratio which corresponds to the ratio of the target regenerative force Frg* at each wheel 2. In association with this, a magnetic field strength indication signal Smf is determined based on a current wheel speed V. The indication signal Smf so determined is outputted to the motor 1. Similarly, the friction braking device 3 is controlled based on the frictional force Ffr so that the friction braking force approaches the target frictional force Ffr*.

According to the embodiment which uses the power distribution type electric vehicle, the regenerating braking force can be obtained as a total sum of the braking forces which follow the power distribution ratios for the respective wheels 2. Even with this method, since individual braking forces by the friction braking and the regenerative braking can be specified with good accuracy, a similar advantage to that of the first embodiment can be provided.

Note that according to the one or more embodiments of the present invention, while the regenerative braking and friction braking are controlled for all the four wheels 2, the invention is not limited thereto, but the cooperative control may be performed for only some specific wheel 2. For example, based on the knowledge that a larger braking force is required on the outer wheel 2 than the inner wheel 2, the regenerative braking is applied only to the outer wheel 2. In addition, the invention can be applied not only to the electric vehicles but also hybrid vehicles in which the motor 1 and an engine are installed as drive sources.

In addition, according to one or more embodiments of the present invention, the detection unit 7 only has to be able to detect an operating force which acts in a direction of a necessary component force. Consequently, the detection unit 7 may be a six component force detector which can detect six component forces including three component forces in three directions and moments around three directions. Even with such a configuration, since operating forces which are necessary for estimation can at least be detected, there is, of course, caused no problem. Note that as to the method of detecting six component forces acting on the wheel, for example, JP-A-2002-039744 and JP-A-2002-022579 disclose such methods.

Additionally, while, according to one or more embodiment of the present invention, the detection unit 7 has been described as being embedded in the axle 2a, the invention is not limited thereto but other variations can be taken into consideration. From the viewpoint of detecting operating forces, the detection unit 7 may be provided on, for example, the hub and the hub carrier. Note that as to a method of providing the detection unit 7 on the hub, for example, JP-A-2003-104139 discloses such a method.

Furthermore, as to the friction braking device 3, an electromechanical brake (EMB) can be used. In this case, the invention can be applied thereto for controlling an indication signal to an electric actuator which constitutes part of the electromechanical brake. Note that as to the electromechanical brake, for example, JP-A-11-315865 discloses such a brake.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A vehicle braking system comprising:
    a regenerative braking device that generates a regenerative braking force to a wheel according to an amount of power generated by a motor;
    a friction braking device that generates a friction braking force to the wheel according to a frictional force;
    a detection unit that directly detects a longitudinal force and a brake torque that act on the wheel;
    a computation unit that computes a current value of the friction braking force based on the brake torque and a current value of the regenerative braking force by subtracting a longitudinal force generated by a friction braking from said longitudinal force;
    a brake sensor;
    a calculation unit that calculates a required braking force based on a result of a detection by the brake sensor;
    a setting unit that sets a target value of the regenerative braking force and a target value of the friction braking force based on the required braking force; and
    a control unit that controls the regenerative braking device based on the current value of the regenerative braking force so as to approach to the target value for the regenerative braking force, and controls the friction braking device based on the current value of the friction braking force so as to approach to the target value for the friction braking force.

2. The vehicle braking system according to claim 1, wherein the vehicle includes a plurality of wheels and a plurality of motors respectively provided to the plurality of wheels, and
    the control unit adjusts the regenerative braking force for each of the wheels by controlling each of the motors.

3. The vehicle braking system according to claim 1, wherein the vehicle includes a plurality of wheels and a plurality of motors, and the vehicle braking system further comprises:
    a power distribution device that variably sets a distribution ratio of the regenerative braking force generated to each of the wheels by the plurality of motors, and
    wherein the control unit adjusts the regenerative braking force for the respective wheels as a group by controlling the power distribution device and the plurality of motors.

4. The system of claim 1, wherein the detection unit is on an axle of a vehicle.

5. The system of claim 1, wherein the detection unit is on an output shaft of the motor.

6. The system of claim 1, wherein the detection unit detects a net longitudinal force, a net lateral force, a net vertical force and a net brake torque on the wheel.

7. The system of claim 1, wherein the detection unit comprises a strain gauge.

8. The system of claim 1, wherein the brake sensor comprises a sensor for detecting a pedaling force applied onto a brake pedal.

9. The system of claim 8, wherein the sensor comprises a pressure sensor for detecting a cylinder pressure of a brake master cylinder.

10. A vehicle braking method for braking by controlling a regenerative braking device for generating a regenerative braking force to a wheel according to an amount of power generated by a motor and a friction braking device for generating a friction braking force to the wheel according to a frictional force, the vehicle braking method comprising:
    directly detecting a longitudinal force and a brake torque that act on the wheel;
    computing a current value of the friction braking force based on the brake torque, and a current value of the regenerative braking force by subtracting a longitudinal force generated by a friction braking from said longitudinal force;
    detecting an output of a brake sensor;
    calculating a required braking force based on the output of the brake sensor;
    setting a target value for the regenerative braking force and a target value for the friction braking force based on a required braking force; and
    controlling the regenerative braking device based on the current value of the regenerative braking force so that the regenerative braking force approaches to the target value for the regenerative braking force and controlling the friction braking device based on the current value of the friction braking force so that the friction braking force approaches to the target value for the friction braking force.

11. The method of claim 10, wherein said directly detecting comprises detecting a net operating force on an axle of a vehicle.

12. The method of claim 10, wherein said directly detecting comprises detecting a net force on an output shaft of the motor.

13. The method of claim 10, wherein said directly detecting comprises detecting a net longitudinal force, a net lateral force, a net vertical force and a net brake torque on the wheel.

14. The method of claim 10, wherein said directly detecting comprises detecting a deformation using a strain gauge.

15. The method of claim 10, wherein said detecting the output of the brake sensor comprises detecting a pedaling force applied onto a brake pedal.

16. The method of claim 15, wherein said detecting the pedaling force comprises detecting a cylinder pressure of a brake master cylinder.

17. A vehicle braking system comprising:
- a regenerative braking device that generates a regenerative braking force to a wheel according to an amount of power generated by a motor;
- a friction braking device that generates a friction braking force to the wheel according to a frictional force;
- a detection unit that directly detects a longitudinal force and a brake torque that act on the wheel;
- a brake sensor;
- a calculation unit that calculates a required braking force that is required braking force to the wheel based on a result of a detection by the brake sensor;
- a computation unit that computes a current value of the friction braking force based on the brake torque and a current value of the regenerative braking force by subtracting a longitudinal force generated by a friction braking from said longitudinal force;
- a setting unit that sets a target value of the regenerative braking force and a target value of the friction braking force based on the required braking force; and
- a control unit that controls the regenerative braking device based on the current value of the regenerative braking force so as to approach to the target value for the regenerative braking force, and controls the friction braking device based on the current value of the friction braking force so as to approach to the target value for the friction braking force.

18. The system of claim 17, wherein the detection unit is on an axle of a vehicle.

19. The system of claim 17, wherein the detection unit is on an output shaft of the motor.

20. The system of claim 17, wherein the detection unit detects a net longitudinal force, a net lateral force, a net vertical force and a net brake torque on the wheel.

21. The system of claim 17, wherein the detection unit comprises a strain gauge.

22. The system of claim 17, wherein the brake sensor comprises a sensor for detecting a pedaling force applied onto a brake pedal.

23. The system of claim 22, wherein the sensor comprises a pressure sensor for detecting a cylinder pressure of a brake master cylinder.

* * * * *